May 26, 1959  H. B. BARRETT  2,887,736
WINDSHIELD CLEANER SYSTEMS AND VALVES THEREFOR
Filed Dec. 10, 1956

INVENTOR.
HARRY B. BARRETT
BY
ATTORNEY

United States Patent Office 2,887,736
Patented May 26, 1959

2,887,736
WINDSHIELD CLEANER SYSTEMS AND VALVES THEREFOR

Harry B. Barrett, Clayton, Mo.

Application December 10, 1956, Serial No. 627,503

7 Claims. (Cl. 20—40.5)

This invention relates in general to certain new and useful improvements in windshield cleaner systems and more particularly, to a self-purging windshield cleaner system and valve therefor.

Most present day automobiles are equipped with a system for spraying the windshield with a cleansing liquid to remove mud, road-soil, and dirt. Such systems usually consist of a vacuum-operated pump mounted under the hood of the vehicle which, when actuated by a control valve on the dashboard, squirts streams of water or other cleaning liquid onto the windshield through a plurality of small nozzles, usually mounted at the bottom of the windshield molding. Frequently, these systems become inoperative due to the fact that slush, mud, and other road dirt enters the small orifices of the nozzles and clogs them. It has been found that the stream of cleaning liquid which passes through the orifices during the operation of the system often will not free the clogged orifices, but in fact, causes the particles of dirt and other foreign matter to further accumulate in and around the orifices and aggravate the clogged condition.

It is, therefore, a primary object of the present invention to provide a windshield cleaner system in which the nozzle orifices can be cleaned or purged whenever necessary in a simple, convenient, and efficient manner.

It is an additional object of the present invention to provide a windshield cleaner system including means for purging the nozzle orifices by drawing air reversely through the orifices.

It is a further object of the present invention to provide a unique and novel control valve which may easily be incorporated into a conventional, vacuum-operated windshield cleaner system and will permit the drawing of air under a vacuum through the nozzle orifices, thus removing any foreign matter therefrom.

With the above and other objects in view, my invention resides in the novel features of form, construction, arrangement, and combination of parts presently described and pointed out in the claims.

In the accompanying drawing—

Figure 1:
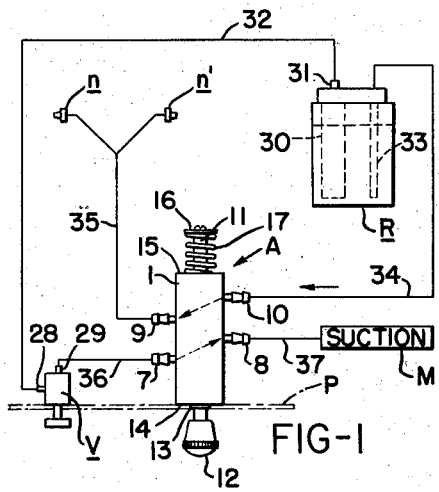
Fig. 1 is a diagrammatic view of a windshield cleaner system constructed in accordance with and embodying the present invention.
Figure 2:
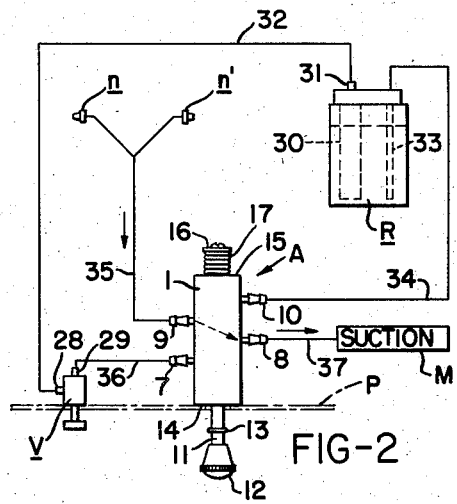
Fig. 2 is a diagrammatic view of the windshield cleaner system illustrating the control valve in position to permit reverse flow of air through the nozzle orifices.

Referring now in more detail and by reference characters to the drawing, which illustrates a preferred embodiment of the present invention, A designates a valve preferably comprising an elongated valve-body 1 having a chamber-forming drill-hole 2 extending axially therethrough from end to end, and provided with four axially spaced radially extending ports 3, 4, 5, 6, each having outwardly projecting connection nipples 7, 8, 9, 10, respectively, which are conventionally formed at their outer ends 7', 8', 9', 10' to receive the usual type of rubber tubing (not shown) commonly employed in automotive windshield wiper systems. It should, of course, be understood, in this connection, that the outer ends of the nipples can be modified for engagement with any desired type of piping or tubing as may be desired.

Slidably mounted within and extending lengthwise through the drill-hole 2 is a rod-like valve stem 11 provided at its forward end 11' with a knob 12 and encirclingly disposed around the stem 11 slightly to the rear of the knob 12 is an O-ring 13 which is adapted to abut against the forwardly presented end face 14 of the valve-body 1 and serve as a stop. At its rear end 14' the valve stem 11 projects beyond the rear face 15 of the valve-body 1 and at its outer extremity is provided with a diametrally enlarged washer 16. Disposed encirclingly around the rearwardly projecting end of the valve stem 11 is a compression spring 17 which abuts at one end against the rear face 15 and at the other end against the washer 16 thereby normally urging the valve stem 11 rearwardly into the position shown in Fig. 3.

Figure 3:
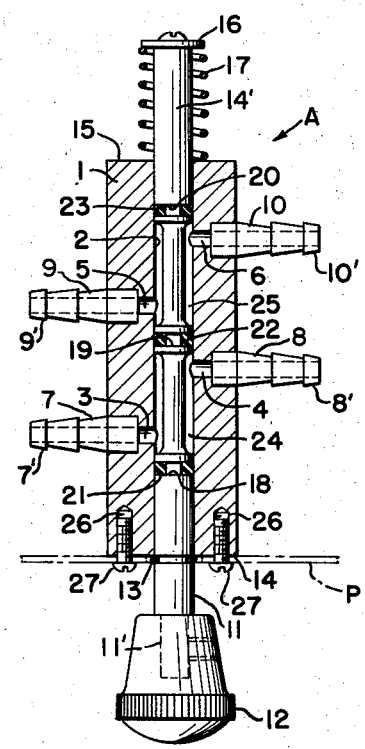
Figs. 3 and 4 are longitudinal sectional views on an enlarged scale of the control valve in its two alternative positions.
Figure 4:
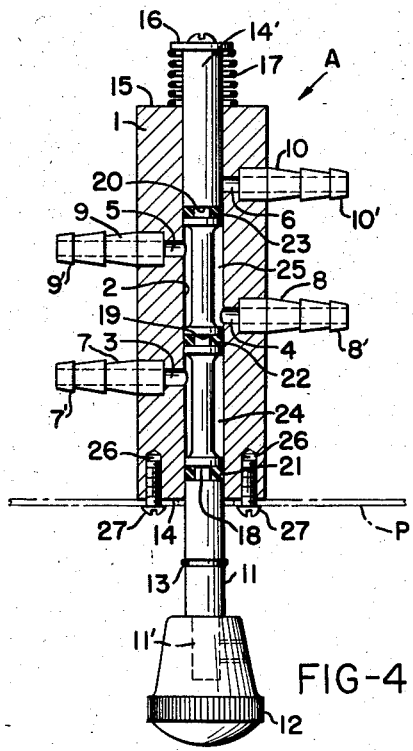

The valve stem 11 is turned down along three axially spaced portions of its length in the provision of narrow peripheral grooves 18, 19, 20, which are provided with sealing rings 21, 22, 23, respectively, adapted for snug-fitting sliding engagement with the interior cylindrical surface of the drill-hole 2. The valve stem 11 is also turned down along the two portions of its length which extend between the grooves 18, 19 and 19, 20, respectively, in the provision of two relatively long peripheral communication grooves 24, 25. As will be seen by reference to Figs. 3 and 4, the length of the communication grooves 24, 25, and the relative positions of the sealing rings 21, 22, 23, are such that when the valve stem 11 is in normal position as shown in Fig. 3, there will be communication through groove 24 between the ports 3, 4, and communication through groove 25 between the ports 5, 6. However, when the valve stem 11 is pulled forwardly to the position shown in Fig. 4, the ports 3 and 6 will be closed off and there will be communication only between ports 4, 5, through groove 25.

The valve-body 1 is provided in its forwardly presented end-face 14 with drilled and tapped holes 26 and short attachment bolts 27 by which the valve A can be secured to an automobile instrument panel P in the usual manner. Also secured to the instrument panel P in any convenient location is a conventional control valve $v$ of a type ordinarily used in windshield wiper systems and having two connection nipples 28, 29. Similarly mounted in the windshield cowling (not shown) are two small nozzles $n$, $n'$ of conventional design. Finally, the system of the present invention includes a reservoir R containing water or similar cleansing liquid and provided with a conventional vacuum operated piston-type pump 30 having a connection nipple 31, connected by a tube or conduit 32 of the nipple 28 of valve $v$. Also mounted in the reservoir R and extending downwardly thereunto is a liquid feeder-tube 33 connected by a tube or conduit 34 to the nipple 10 of the valve A. The nipple 9 of the valve A is connected by a tube or conduit 35 to the nozzles $n$, $n'$, and the nipple 7 of valve A is similarly connected by suitable tubing 36 to the nipple 29 of valve $v$. Finally, the nipple 8 of valve A is connected by suitable tubing 37 to the intake manifold M of the automobile.

Ordinarily when the nozzles $n$, $n'$ are unclogged and the system is functioning properly, the valve A is left in normal position as shown in Figs. 1 and 3. In such position, the valve $v$ may be opened or closed at the will of the operator. When the valve $v$ is opened, the suction of the manifold M will exert negative pressure, so to speak, through the line 37 across the valve A between the ports 3, 4, and through the line 36, valve v and line 32 to the pump 30 which is operated by such negative pressure to pump liquid from reservoir R through line 34, across valve A between ports 5, 6, and through line 35 to the nozzles n, n'. If, however, these nozzles n, n' are clogged, the knob 12 of valve A is pulled forwardly to the position shown in Fig. 4 whereupon the flow of liquid from the reservoir R is cut off and the suction from the manifold M is directly exerted upon the nozzles n, n' through line 35. Any dirt or foreign particles which may have worked into and clogged the nozzles will be sucked back and discharged through the intake manifold M, thus purging the system. The suction created by the intake manifold M is quite large in relation to the size of the orifices in the nozzles n, n', hence even if only one of the nozzles n, n' is clogged, the suction force will be adequate to purge the clogged nozzle notwithstanding the fact that some of the suction force is dissipated through the open nozzle.

It should be understood that changes and modifications in the form, construction, arrangement, and combination of the several parts of the windshield cleaner system and valve therefor may be made and substituted for those herein shown and described without departing from the nature and principle of my invention.

Having thus described my invention, what I claim and desire to secure by Letters Patent is:

1. A windshield spray system comprising a spray nozzle a source of fluid under pressure having means connected to said nozzle, a source of negative pressure, and valve means in said first mentioned means alternatively connecting said nozzle to said source of fluid pressure and to said source of negative pressure whereby optionally to spray fluid through said nozzle when the nozzle is connected to the source of fluid pressure and purge the nozzle when the nozzle is connected to the source of negative pressure.

2. A windshield spray system comprising a spray nozzle, a fluid reservoir, conduit means connecting said reservoir to the spray nozzle to permit flow of fluid from the reservoir to the spray nozzle, pumping means associated with the reservoir for causing fluid to flow under positive pressure through the conduit means from the reservoir to the spray nozzle, a source of negative pressure, valve means interposed in said conduit means and auxiliary conduit means connecting the valve means to a source of negative pressure, said valve means being operative for alternatively shutting off the delivery of fluid under pressure to the spray nozzle and connecting the spray nozzle to the source of negative pressure whereby to apply negative pressure to the spray nozzle for purging the latter.

3. A windshield spray system comprising nozzle means located in juxtaposition to the windshield, a reservoir for holding a supply of windshield cleaning liquid, a source of negative pressure, a valve, first conduit means connecting the valve to the nozzle means, second conduit means connecting the valve to the reservoir, third conduit means connecting the valve to the source of negative pressure, a source of pressure associated with the reservoir for causing the liquid to flow under positive pressure through the second conduit means, and means operatively disposed within the valve for optionally connecting the first and second conduit means whereby to permit cleaning fluid to flow under pressure through the nozzle means and connecting the first and third conduit means whereby to apply negative pressure to the nozzle means thereby purging the latter.

4. A windshield spray system comprising nozzle means located in juxtaposition to the windshield, a reservoir for holding a supply of windshield cleaning liquid, a source of negative pressure, a valve, first conduit means connecting the valve to the nozzle means, second conduit means connecting the valve to the reservoir, third conduit means connecting the valve to the source of negative pressure, a source of pressure associated with the reservoir for causing the liquid to flow under positive pressure through the second conduit means, and manually operable means in the valve for optionally connecting the first and second conduit means whereby to permit cleaning fluid to flow under pressure through the nozzle means and connecting the first and third conduit means whereby to apply negative pressure to the nozzle means thereby purging the latter.

5. A windshield spray system as defined in claim 3 in which the source of positive pressure is a pump.

6. A windshield spray system as defined in claim 3 in which the source of positive pressure is a suction powered pump.

7. A windshield spray system as defined in claim 3 in which the source of negative pressure is an automobile intake manifold and the third conduit means is connected directly to such manifold whereby to discharge the dirt and other material purged from the spray nozzle outwardly through the manifold without passing through the second conduit means and reservoir.

References Cited in the file of this patent

UNITED STATES PATENTS

| | | |
|---|---|---|
| 2,597,059 | Bitzer | May 20, 1952 |
| 2,633,324 | Bierman | Mar. 31, 1953 |
| 2,650,003 | Coleman | Aug. 25, 1953 |
| 2,688,514 | Oishei | Sept. 7, 1954 |
| 2,782,801 | Ludwig | Feb. 26, 1957 |